United States Patent [19]

Akiyama

[11] 4,330,336

[45] May 18, 1982

[54] METHOD OF PRODUCING LOW-LINE ALUMINOUS CEMENT FROM ALUMINUM SMELTING RESIDUE

[75] Inventor: Keiichi Akiyama, Tokyo, Japan

[73] Assignee: Japan Aluminium Alloy Refiners Association, Tokyo, Japan

[21] Appl. No.: 290,129

[22] Filed: Aug. 5, 1981

[51] Int. Cl.$^3$ .............................................. C04B 7/32
[52] U.S. Cl. .................................................. 106/104
[58] Field of Search ........................................ 106/104

[56] References Cited

U.S. PATENT DOCUMENTS

| | | | |
|---|---|---|---|
| 1,853,406 | 4/1932 | Carothers | 106/104 |
| 2,099,176 | 11/1937 | Scripture, Jr. | 106/104 |
| 2,859,124 | 11/1958 | King | 106/104 |
| 3,944,426 | 3/1976 | Nickelsen | 106/104 |
| 4,071,373 | 1/1978 | Akiyama | 106/104 |

*Primary Examiner*—Mark Bell
*Attorney, Agent, or Firm*—Jordan and Hamburg

[57] ABSTRACT

A certain amount of a starting calcarious material is added to an aluminum smelting residue, the mixture is smelted or semi-smelted, air is blown to the smelted or semi-smelted product to oxidize A/N, and the smelted or semi-smelted product is finely pulverized to obtain a low-lime aluminous cement.

An excellent refractory aluminous cement can be prepared according to this method.

9 Claims, No Drawings

METHOD OF PRODUCING LOW-LINE ALUMINOUS CEMENT FROM ALUMINUM SMELTING RESIDUE

BACKGROUND OF THE INVENTION

The present invention relates to a method of producing a low-lime aluminous cement from an aluminum smelting residue. More particularly, the present invention relates to an improvement in the method disclosed by us in U.S. Pat. No. 4,071,373.

Aluminum smelting residues produced as by-products in the aluminum industry are partially used for the preparation of heat-insulating materials and slag-forming agents to be used in the industry of iron and steel. However, the amounts used of these aluminum smelting residues have recently been decreasing. Furthermore, since these residues contain aluminum nitride and aluminum carbide, they generate ammonia gas and unsaturated hydrocarbons and emit bad smells on contact with rain water or sea water. Accordingly, from the viewpoint of prevention of environmental pollution, it is not permissible to discard them simply as industrial wastes.

SUMMARY OF THE INVENTION

We made researches with a view to developing a method of producing a low-lime aluminous cement having a high refractoriness and a long-durable strength by utilizing aluminum smelting residues, the disposal of which involves the above-mentioned problems, as a valuable $Al_2O_3$ resource replacing bauxite without causing environmental pollution. As the result, we have now completed the present invention.

More specifically, in accordance with the present invention, there is provided a method of producing a low-lime aluminous cement from an aluminum smelting residue, which comprises mixing an aluminum smelting residue with a starting calcareous material and smelting or semi-smelting the mixture, wherein the starting calcareous material is added in such an amount, relatively to $SiO_2$, $Al_2O_3$ and MgO contained in the aluminum smelting residue, that the smelted or semi-smelted mixture of the aluminum smelting residue and starting calcareous material has a composition of $2CaO.Al_2O_3.SiO_2$, $MgO.Al_2O_3$ and $CaO.nAl_2O_3$ and the CaO content in said mixture is 20 to 30% by weight, the smelted or semi-smelted product formed by smelting or semi-smelting the mixture is pulverized by strongly blowing air to the smelted or semi-smelted mixture to oxidize AlN, and the pulverized product is then finely divided. The mixture of the aluminum smelting residue and the starting calcarious material may be smelted or semi-smelted at a temperature of 1400° to 2100° C.

DETAILED DESCRIPTION OF THE PREFERRED EMBODIMENTS

An aluminum smelting residue is as ash rising to the surface of a melt when an aluminum scrap or alloy is remolten. Ordinarily, this ash is scraped out from the surface of the molten metal, is then squeezed once or twice to recover the residual metal and is pulverized. This aluminum smelting residue contains various metal oxides as impurities, and though the chemical composition differs to some extent according to the kind of the starting metal material to be smelted, the aluminum smelting residue has the following main ingredients.

Chemical Composition of Aluminum Smelting Residue

| | |
|---|---|
| $SiO_2$ | less than 10% |
| $Al_2O_3$ | 65–95% |
| $Fe_2O_3$ | less than 5% |
| MgO | less than 20% |
| Al | less than 20% |
| AlN | less than 20% |
| Others | less than 5% |

In case of a starting metal material having a high Si content, Si is intruded in the form of $SiO_2$ into the residue, and in case of a starting metal material having a high Mg content, Mg is included in the residue in the form of free MgO or spinel. Since residual Al is not completely recovered by squeezing, Al is included in the residue in the form of aluminum powder, and AlN is formed by reaction of Al with nitrogen in air while the starting metal material is smelted.

When an aluminous cement is prepared from such aluminum smelting residue and a starting calcareous material, since $SiO_2$, MgO and other metal oxides are contained in much larger quantities in the starting material than in a bauxite material, if CaO is included in a large amount, $2CaO.SiO_2$, $12CaO.7Al_2O_3$ or free MgO are included in a clinker and other metals are made free in the clinker, with the result that the quality of a cement is degraded. Accordingly, a special care should be taken for eliminating bad influences of SiO and MgO contained in the starting material. Therefore, the method of the present invention is directed to the production of a special aluminous cement having a composition different from that of an ordinary aluminous cement. Incidentarily, the chemical composition of an ordinary aluminous cement is usually as follows:

Chemical Composition of Ordinary Aluminous Cement

| | |
|---|---|
| $SiO_2$ | less than 8% |
| $Al_2O_3$ | 40–65% |
| $Fe_2O_3$ | less than 15% |
| CaO | 35–45% |
| MgO | less than 5% |

The ingredient compounds of this ordinary aluminous cement are $CaO.Al_2O_3$, $12CaO.7Al_2O_3$, $2CaO.SiO_2$, $4CaO.Al_2O_3.Fe_2O_3$ and free MgO. In the present invention, $12CaO.7Al_2O_3$, $2CaO.SiO_2$ and free MgO in the above composition are eliminated and $CaO.Al_2O_3$ or $CaO.2Al_2O_3$, $2CaO.Al_2O_3.SiO_2$ and $MgO.Al_2O_3$ are included instead.

$2CaO.SiO_2$ is a main hydraulic compound of Portland cement. When this compound is included in an aluminous cement, $Ca(OH)_2$ formed by the hydration action of this compound makes the hydration action of $CaO.Al_2O_3$ abnormal to render the cement quick setting and quick hardening and reduce the strength. Accordingly, it is preferred that the content of this compound be small.

In the present invention, $SiO_2$ is converted to gehlenite, no particular disadvantage is brought about even if the content of $SiO_2$ in the starting material is relatively high. It is known that $2CaO.Al_2O_3.SiO_2$ has a latent hydraulic property. This compound does not exhibit the hydration action directly but exerts the hydration action over a long period. Accordingly, this compound is effective for manifesting the long-period strength in an aluminous cement. The long-period strength of an aluminous cement ordinarily tends to decrease. Therefore, incorporation of $2CaO.Al_2O_3.SiO_2$ in an aluminous cement results in improvements of properties of the aluminous cement and bad influences of $2CaO.SiO_2$ are eliminated by incorporation of this compound.

In $2CaO.SiO_2$, the contents of CaO and $SiO_2$ are 65.1% by weight and 34.9% by weight, respectively. In $CaO.Al_2O_3$, the contents of CaO and $Al_2O_3$ are 35.4% by weight and 64.6% by weight, respectively. In $CaO.2Al_2O_3$, the contents of CaO and $Al_2O_3$ are 21.5% by weight and 78.5% by weight, respectively. Furthermore, in $2CaO.Al_2O_3.SiO_2$, the contents of CaO, $Al_2O_3$ and $SiO_2$ are 40.9% by weight, 37.2% by weight and 21.9% by weight, respectively, and in $MgO.Al_2O_3$, the contents of MgO and $Al_2O_3$ are 28.2% by weight and 71.8% by weight, respectively.

In the CaO content in the clinker is higher than 35% by weight, undesirable $2CaO.SiO_2$ is formed in the aluminous cement, and $3CaO.Al_2O_3$ (52.2% by weight of CaO and 37.8% by weight of $Al_2O_3$) or $12CaO.7Al_2O_3$ (48.5% by weight of CaO and 51.5% by weight of $Al_2O_3$) having highly quick setting and hardening properties is formed. Furthermore, MgO is rendered free to degrade the properties of the aluminous cement. Moreover, if $MgO.Al_2O_3$ or $2CaO.Al_2O_3.SiO_2$ is formed in the aluminous cement, since $Al_2O_3$ in the clinker is consumed, the ratio of CaO to $Al_2O_3$ is increased above 1.

In view of the foregoing facts, in order to include $CaO.Al_2O_3$, $2CaO.Al_2O_3.SiO_2$ and $MgO.Al_2O_3$ in an aluminous cement produced from an aluminum smelting residue, it is preferred that the CaO content in the clinker be lower than 35% by weight, and in order to include $CaO.2Al_2O_3$ in the aluminous cement, it is preferred that the CaO content be smaller than 30% by weight. Accordingly, if the residue is composed solely of pure $Al_2O_3$, the CaO content can be increased to 35% by weight. However, since $SiO_2$ or MgO is ordinarily included in the residue, it is indispensable that the CaO content in the clinker should be controlled to 20 to 30% by weight. If the CaO content is thus controlled, all of MgO is combined with $Al_2O_3$ to form $MgO.Al_2O_3$ and no free MgO is formed. The melting point of $MgO.Al_2O_3$ in the range of from 2000° to 2100° C. and this compound imparts a fire resistance to the aluminous cement and has no bad influences on the water hardenability of the aluminous cement.

Metallic aluminum in the starting residue is oxidized to $Al_2O_3$ during the step of sintering and smelting the clinker. Accordingly, such Al is valuable as the $Al_2O_3$ source. Although AlN is partially oxidized, it is left in the clinker in a rertain amount, and it is necessary to remove this residual AlN.

If AlN is left in the clinker, when a cement obtained by pulverizing the clinker is hydrated, ammonia gas is formed by the following reaction to cause environmental pollution and the hardened cement is rendered coarse by formation of bubbles:

$$AlN + 3H_2O \rightarrow NH_3 + Al(OH)_3$$

We found that when a smelted or semi-smelted clinker is taken out from a furnace, if a large quantity of air is blown to the clinker in the red-hot state, the residual AlN is oxidized according to the following reactions and the residual AlN can be removed;

$$2AlN + 3O_2 = Al_2O_3 + N_2O_3$$

$$2N_2O_3 + O_2 = 4NO_2$$

Namely, the residual AlN is oxidized by oxygen contained in air to $Al_2O_3$ and $NO_2$ gas. $Al_2O_3$ released by the above reactions is combined with lime at high temperatures during cooling to promote formation of $CaO.Al_2O_3$ or $CaO.2Al_2O_3$.

The method of producing an aluminous cement from an aluminum smelting residue according to the present invention will now be described in detail with reference to the following Examples.

EXAMPLE 1

The chemical composition of the aluminum smelting residue used is as follows:

| | |
|---|---|
| ignition loss | 0.8% |
| $SiO_2$ | 4.7% |
| $Al_2O_3$ | 81.3% |
| $Fe_2O_3$ | 4.6% |
| MgO | 10.9% |
| $TiO_2$ | 1.2% |
| Metallic Al | 11.1% |
| AlN | 12.4% |

Based on the assumption that $SiO_2$ is combined with CaO and $Al_2O_3$ to form $2CaO.Al_2O_3.SiO_2$ and a part of remaining $Al_2O_3$ is combined with MgO to form $MgO.Al_2O_3$, the amount of lime necessary for formation of $CaO.Al_2O_3$ by reaction of the remainder of $Al_2O_3$ with CaO is calculated. It is found that the amount of lime is 60.4 parts per 100 parts of the aluminum smelting residue. The chemical composition of a clinker obtained by sintering or smelting this composition is as follows:

Chemical Composition of Clinker

| | |
|---|---|
| $SiO_2$ | 3.5% |
| $Al_2O_3$ | 60.7% |
| $Fe_2O_3$ | 3.4% |
| CaO | 25.3% |
| MgO | 8.1% |
| $TiO_2$ | 0.9% |

When this clinker is subjected to the X-ray analysis, it is found that the clinker comprises 0.3% of AlN, 28.7% of $MgO.Al_2O_3$, 15.9% of $2CaO.Al_2O_3.SiO_2$, 52.8% of $CaO.Al_2O_3$ and a trace of $CaO.2Al_2O_3$ with the total being at least 98.8%. This clinker is finely divided to have a Blaine value of about 4000 $cm^2/g$. The results of the physical tests made on the so-obtained aluminous cement are as follows.
Setting Time:
  Initial: 1 hour and 15 minutes
  Final: 2 hours and 35 minutes
Compressive Strength ($Kg/cm^2$):
  1 day: 415
  3 days: 429
  7 days: 457
  28 days: 524

When a cement mortar specimen is prepared by kneading the so obtained cement with water and sand, no ammonia smell is produced. Accordingly, it is confirmed that an excellent heat-resistance special aluminous cement producing no bad smell is obtained in this Example. Although the melting point of an ordinary aluminous cement is 1400° to 1600° C., the special aluminous cement of the present invention, which is different from the ordinary aluminous cement in the chemical composition and mineral composition, has a melting point of 1600° to 1800° C. and it exhibits a very high fire resistance.

EXAMPLE 2

The chemical composition of the aluminum smelting residue used is as follows:

| | |
|---|---|
| Ignition loss | 0.8% |
| $SiO_2$ | 4.7% |
| $Al_2O_3$ | 81.3% |
| $Fe_2O_3$ | 4.6% |
| MgO | 10.9% |
| $TiO_2$ | 1.2% |
| Total | 103.5% |

Quick lime is incorporated in this residue in an amount of 33.8 parts per 100 parts of the residue, and the mixture is charged in a Söderberg type electric furnace and smelted at a temperature higher than 1800° C. When the melt is discharged from the furnace, high pressure air is blown to the melt to convert the melt to small masses having a length of 1 to 3 cm and a width of 0.1 to 0.6 cm. The small masses are rapidly cooled to form a vitreous clinker. N in AlN is thus completely removed and $Al_2O_3$ formed by oxidation is combined with CaO. The chemical composition of the so obtained clinker is as follows:

| | |
|---|---|
| $SiO_2$ | 3.5% |
| $Al_2O_3$ | 60.7% |
| $Fe_2O_3$ | 3.4% |
| CaO | 25.3% |
| MgO | 8.1% |
| $TiO_2$ | 0.9% |

When the clinker is subjected to the X-ray analysis, it is found that the clinker has the following mineral composition.

| | |
|---|---|
| $MgO \cdot Al_2O_3$, spinel | 28.7% |
| $2CaO \cdot Al_2O_3 \cdot SiO_2$, gehlenite | 15.9% |
| $CaO \cdot Al_2O_3$, calcium aluminate | 52.9% |
| Total | 98.8% |

The clinker is finely divided to have a Blaine value of about 4000 cm$^2$/g, and the physical properties are determined to obtain the following results.
Setting Time:
  Initial: 1 hour and 15 minutes
  Final: 2 hours and 35 minutes
Compressive Strength (Kg/cm$^2$):
  1 day: 415
  3 days: 429
  7 days: 457
  28 days: 489

When the resulting cement is mixed with water, formation of ammonia is not observed.

From the foregoing test results, it is confirmed that a high-quality aluminous cement is obtained in this Example.

EXAMPLE 3

Quick lime is incorporated into an aluminum smelting residue in an amount of 18.5 parts per 81.5 parts of the residue, and the mixture is charged in a Söderberg type electric furnace and smelted. Oxygen is blown into the melt and the melt is discharged from the furnace.

The chemical composition of the aluminum smelting residue used is as follows:

| | | |
|---|---|---|
| Ignition loss | | 1.9% |
| $SiO_2$ | | 0.1% |
| $Al_2O_3$ | | 80.0% |
| MgO | | 14.9% |
| $Fe_2O_3$ | | 0.8% |
| $TiO_2$ | | 0.7% |
| AlN | | 22.8% |
| | Total | 98.4% |

Since the residue used contains a large amount of AlN, oxygen is blown into the melt in the furnace to oxidize AlN. Furthermore, air is blown to the discharged melt outside the furnace to rapidly cool the melt, whereby a sponge-like porous solid is obtained. The results of the chemical analysis of the resulting clinker is as follows:

| | |
|---|---|
| $SiO_2$ | trace |
| $Al_2O_3$ | 68.0% |
| CaO | 20.1% |
| MgO | 11.9% |
| AlN | 0% |

From the results of the X-ray analysis, it is confirmed that the main minerals of the clinker are $CaO.Al_2O_3$ and $CaO.2Al_2O_3$ and that also $MgO.Al_2O_3$ is contained in a certain amount but $2CaO.Al_2O_3.SiO_2$ is not contained.

The clinker is finely divided to have a Blaine value of 4000 cm$^2$/g and the hydraulic properties of the resulting cement are determined to obtain the following results.
Setting Time:
  initial: 1 hour and 5 minutes
  Final: 3 hours and 15 minutes
Compressive Strength (Kg/cm$^2$):
  1 day: 281
  3 days: 296
  7 days: 316
  28 days: 320

When the refractoriness of the cement is examined by using a Seger cone, it is found that the refractoriness is No. 36 (1790° C.).

Thus, it is confirmed that a valuable refractory aluminous cement is produced from the aluminum smelting residue in this Example.

As will be apparent from the foregoing description, in the method of producing a low-lime aluminous cement according to the present invention, an excellent aluminous cement can be produced by using an aluminum smelting residue which is an industrial waste causing environmental pollution and is not utilized but discarded, and the resulting low-lime aluminous cement does not cause environmental pollution and is effectively used not only as an ordinary construction material but also as a refractory. Accordingly, the present invention makes great industrial contributions.

What is claimed is:

1. A method of producing a low-lime aluminous cement from an aluminum smelting residue, which comprises mixing an aluminum smelting residue with a starting calcareous material and smelting or semi-smelting the mixture, wherein the starting calcareous material is added in such an amount, relatively to $SiO_2$, $Al_2O_3$ and MgO contained in the aluminum smelting residue, that the smelted or semi-smelted mixture of the aluminum smelting residue and starting calcareous material has a composition of $2CaO \cdot Al_2O_3 \cdot SiO_2$, $MgO \cdot Al_2O_3$ and $CaO \cdot nAl_2O_3$ and the CaO content in said mixture is 20 to 30% by weight, the smelted or semi-smelted product formed by smelting or semi-smelting the mixture is pulverized by strongly blowing air to the smelted or semi-smelted mixture to oxidize AlN, and the pulverized product is then finely divided.

2. A method of producing a low-lime aluminous cement from an aluminum smelting residue according to claim 1, wherein the aluminum smelting residue is mixed with the calcareous material at such a mixing ratio that the smelted or semi-smelted product has a composition of $2CaO \cdot Al_2O_3 \cdot SiO_2$, $MgO \cdot Al_2O_3$ and $CaO \cdot Al_2O_3$.

3. A method of producing a low-lime aluminous cement from an aluminum smelting residue according to claim 1, wherein the aluminum smelting residue is mixed with the calcareous material at such a mixing ratio that the smelted or semi-smelted product has a composition of $2CaO \cdot Al_2O_3 \cdot SiO_2$, $MgO \cdot Al_2O_3$ and $CaO \cdot 2Al_2O_3$.

4. A method of producing a low-lime aluminous cement from an aluminum smelting residue according to any of claims 1 through 3, wherein the aluminum smelting residue has a chemical composition comprising 0.8% of ignition loss, 4.7% of $SiO_2$, 81.3% of $Al_2O_3$, 4.6% of $Fe_2O_3$, 10.9% of MgO, 1.2% of $TiO_2$, 11.1% of metallic Al and 12.4% of AlN.

5. A method of producing a low-lime aluminous cement from an aluminum smelting residue according to any of claims 1 through 3, wherein the aluminum smelting residue has a chemical composition comprising 0.8% of ignition loss, 4.7% of $SiO_2$, 81.3% of $Al_2O_3$, 4.6% of $Fe_2O_3$, 10.9% of MgO and 1.2% of $TiO_2$.

6. A method of producing a low-lime aluminous cement from an aluminum smelting residue according to any of claims 1 through 3, wherein the aluminum smelting residue has a chemical composition comprising 1.9% of ignition loss, 0.1% of $SiO_2$, 80.0% of $Al_2O_3$, 14.9% of MgO, 0.8% of $Fe_2O_3$, 0.7% of $TiO_2$ and 22.8% of AlN.

7. A method of producing a low-lime aluminous cement from an aluminum smelting residue according to any of claims 1 through 3, wherein the mixture of the aluminum smelting residue and the starting calcarious material is smelted or semi-smelted at a temperature of 1400° to 2100° C.

8. A method of producing a low-lime aluminous cement from an aluminum smelting residue according to any of claims 1 through 3, wherein high-pressure air is blown to the smelted or semi-smelted product of the mixture of the aluminum smelting residue and the starting calcarious material to convert the smelted or semi-smelted product into small masses having a length of 1 to 3 cm and a width of 0.1 to 0.6 cm under tapid cooling.

9. A method of producing a low-lime aluminous cement from an aluminum smelting residue according to any of claims 1 through 3, wherein oxygen is blown to the smelted or semi-smelted product of the mixture of the aluminum smelting residue and the starting calcarious material.

* * * * *